United States Patent
Hill et al.

(10) Patent No.: US 11,618,534 B2
(45) Date of Patent: Apr. 4, 2023

(54) SKI TOW FOR BOATS

(71) Applicant: Marine Accessories Corporation, Knoxville, TN (US)

(72) Inventors: William C. Hill, Knoxville, TN (US); Brock Elliot Etters, Knoxville, TN (US); Benjamin Girard Harder, Knoxville, TN (US)

(73) Assignee: Marine Accessories Corporation, Knoxville, TN (US)

(*) Notice: Subject to any disclaimer, the term of this patent is extended or adjusted under 35 U.S.C. 154(b) by 0 days.

(21) Appl. No.: 17/409,936

(22) Filed: Aug. 24, 2021

(65) Prior Publication Data
US 2023/0060669 A1 Mar. 2, 2023

(51) Int. Cl.
*B63B 34/67* (2020.01)
*F16M 11/08* (2006.01)

(52) U.S. Cl.
CPC .............. *B63B 34/67* (2020.02); *F16M 11/08* (2013.01)

(58) Field of Classification Search
CPC .......... F16M 11/2071; F16M 11/2064; F16M 2200/08; F16M 11/08; B63B 34/67; B63B 34/565
USPC .................................................... 248/177.1
See application file for complete search history.

(56) References Cited

U.S. PATENT DOCUMENTS

| | | | | |
|---|---|---|---|---|
| 5,000,109 | A * | 3/1991 | Anderson | B63B 34/60 114/250 |
| 5,018,474 | A * | 5/1991 | Jellen | B63B 34/67 254/416 |
| 5,173,725 | A | 12/1992 | Giles et al. | |
| 5,190,256 | A * | 3/1993 | Macchiarella | B63B 34/67 352/53 |
| 8,733,715 | B2 | 5/2014 | Lee | |
| 9,707,901 | B2 * | 7/2017 | Lee | F16B 2/12 |
| 10,110,786 | B2 * | 10/2018 | Harden | F16G 11/14 |
| 2013/0334386 | A1 * | 12/2013 | Lee | B63B 34/67 248/316.1 |
| 2020/0216147 | A1 * | 7/2020 | Herrick | B63B 21/56 |

OTHER PUBLICATIONS https://www.perfski.com/ski-doc-orbit-camera-mount.html (Year: 2017).*
Screen shot of website www.perfski.com showing the published date (Year: 2017).*
https://teamtalk.mastercraft.com/forum/general-mastercraft-topics/general-discussion/41334-diy-pylon-camera-mount (Year: 2007).*

* cited by examiner

*Primary Examiner* — Christopher Garft
(74) *Attorney, Agent, or Firm* — Luedeka Neely Group, P.C.

(57) ABSTRACT

A ski tow for a boat having a tow post and a ski rope connected to the tow post. The ski tow includes a pedestal shaped body having a lowermost foot spaced apart from an uppermost cap by an intermediate die; a camera mount located on the cap and configured for receiving a camera; and a chase extending vertically through the pedestal body and open on both ends. The pedestal shaped body pivots or rotates such that the camera mount remains aligned with the ski rope as a skier connected to the tow rope moves relative to the tow post and moves the tow rope relative to the tow post.

5 Claims, 10 Drawing Sheets

SKI TOW FOR BOATS

FIELD

This disclosure relates to the field of boat tow devices for watersports. More particularly, this disclosure relates to a ski tow having improved structure, function and aesthetics.

BACKGROUND

Photos and videos of water sports are often taken by cameras mounted to a boat. The focus of the camera is selected so that the field of view captures the skier or wakeboarder or the like (collectively skier) as they ski back and forth across the wake behind the boat. As will be appreciated, this requires a fairly distant focus to encompass the travels of the skier.

What is desired is a ski tow that facilitates use of a camera and enables a camera to follow in alignment a skier being towed by the boat. This is desirable for many reasons, including that it would enable a field of focus that is narrower to enable closeup footage of the skier.

SUMMARY

The above and other needs are met by a ski tow according for a boat having a tow post and a ski rope connected to the tow post.

In one aspect, the ski tow includes a pedestal shaped body having a lowermost foot spaced apart from an uppermost cap by an intermediate die; a camera mount located on the cap and configured for receiving a camera; and a chase extending vertically through the pedestal body and open on both ends. The pedestal shaped body pivots or rotates such that the camera mount remains aligned with the ski rope as a skier connected to the tow rope moves relative to the tow post and moves the tow rope relative to the tow post.

In another aspect, a ski tow includes a ski tow body having an uppermost surface and a camera mount located on the uppermost surface and configured for receiving a camera, wherein the ski tow body pivots or rotates such that the camera mount remains aligned with the ski rope as a skier connected to the tow rope moves relative to the tow post and moves the tow rope relative to the tow post.

In a further aspect, a ski tow includes a ski tow body and a camera mount located on the ski tow body and configured for receiving a camera, wherein the ski tow body pivots or rotates such that the camera mount remains aligned with the ski rope as a skier connected to the tow rope moves relative to the tow post and moves the tow rope relative to the tow post.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
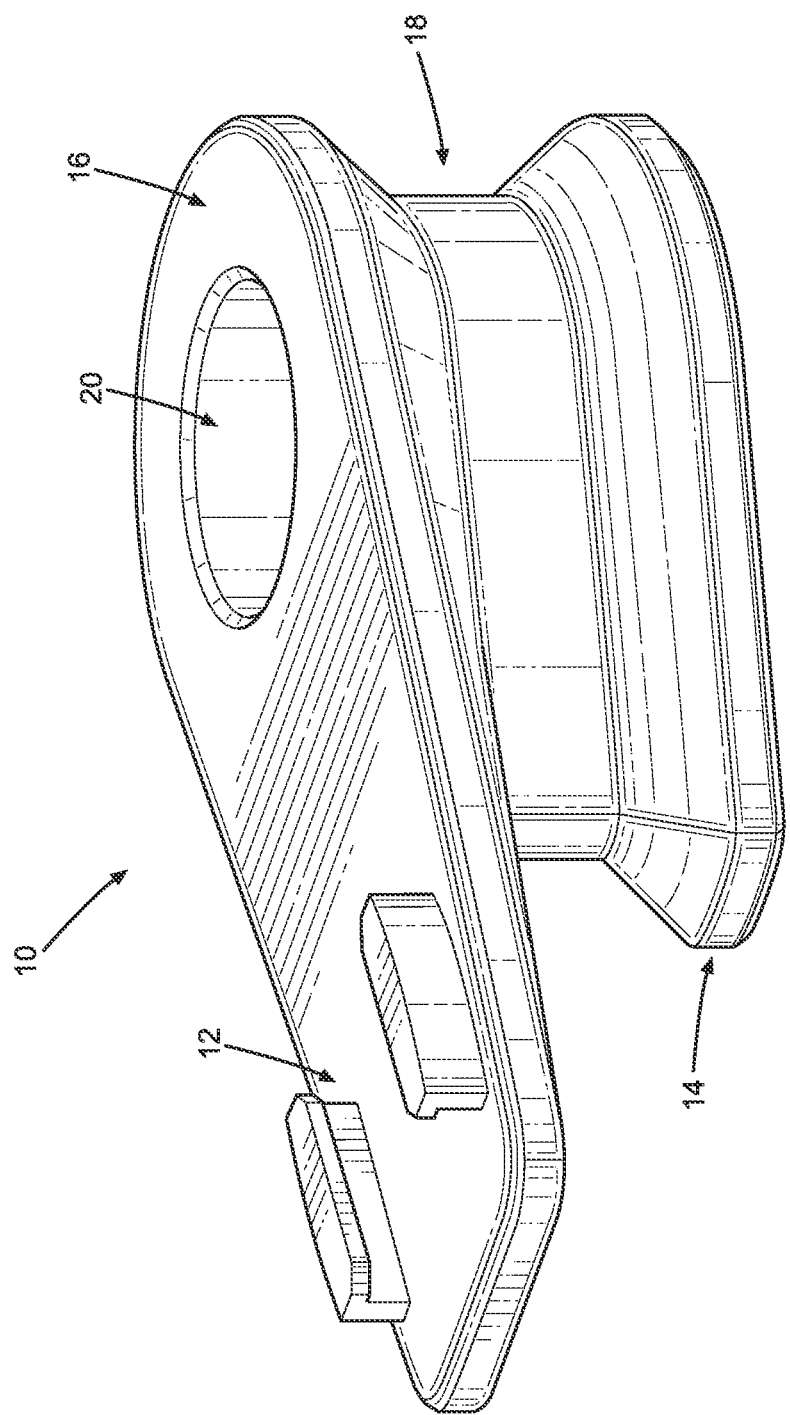
FIG. 1 is a perspective view of a one-piece ski tow according to the disclosure.
Figure 2:
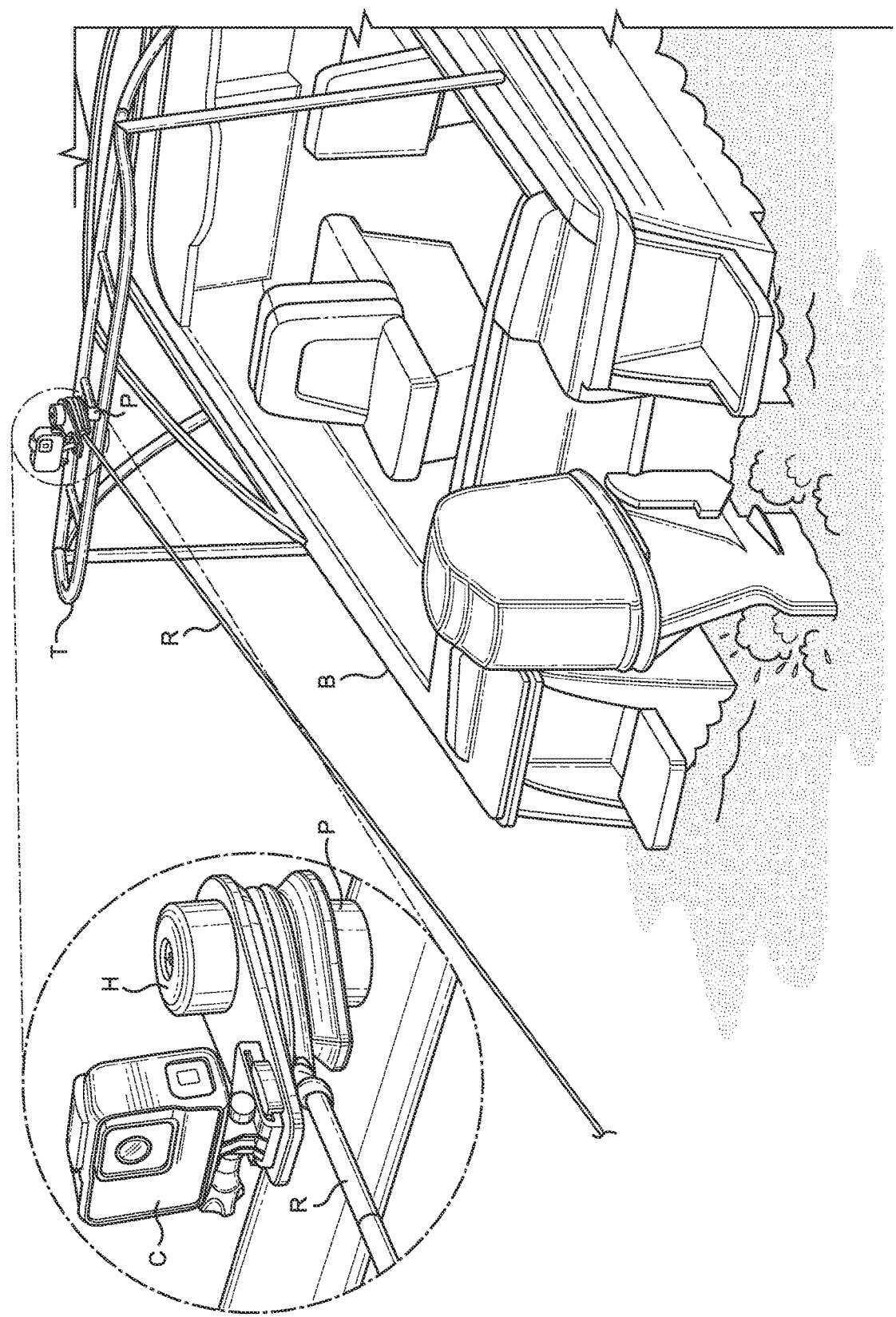
FIG. 2 shows the ski tow mounted to a tow post of a boat located on a wakeboard tower and having a camera mounted to the ski tow.

With initial reference to FIGS. 1-11, there is shown a ski tow 10 according to the disclosure having improved structure, function and aesthetics. The ski tow 10 as shown in FIG. 2 and FIGS. 3A-3B, is desirably configured to pivot and include a camera mount 12 for mounting of a camera C at a forward location of the ski tow 10 for an unobstructed view of a skier or the like that remains aligned with a ski rope R.

The camera C is preferably a conventional action camera or video camera of the type commonly used to photograph or video action sports such as skiing and wakeboarding (collectively skiing for ease of reference). The camera C has a conventional foot or like structure for mounting of the camera to a tripod or other conventional support.

The ski tow 10 is pivotally or rotatably mountable onto a tow post P of a boat B, which may be located on a wakeboard tower T. Alternatively, if the tow post P swivels, the tow point 10 need not itself pivot relative to the tow post P, as the swiveling or pivoting of the tow post P will enable the tow point P to swivel as desired. In either case, the ski tow 10 pivots or rotates in a manner such that the camera C mounted on the ski tow 10 remains aligned with the ski rope R as the skier moves relative to the tow post and moves the tow rope.

The ski tow 10 may be of one-piece construction and formed of plastic, such as nylon, or like rigid material. The ski tow 10 is shaped as a pedestal to have a lowermost foot 14 spaced apart from an uppermost cap 16 by an intermediate die 18. The camera mount 12 is located on the cap 16. A chase 20, preferably circular in cross-section, extends vertically through the ski tow 10 and is open on both ends.

Figure 3A:
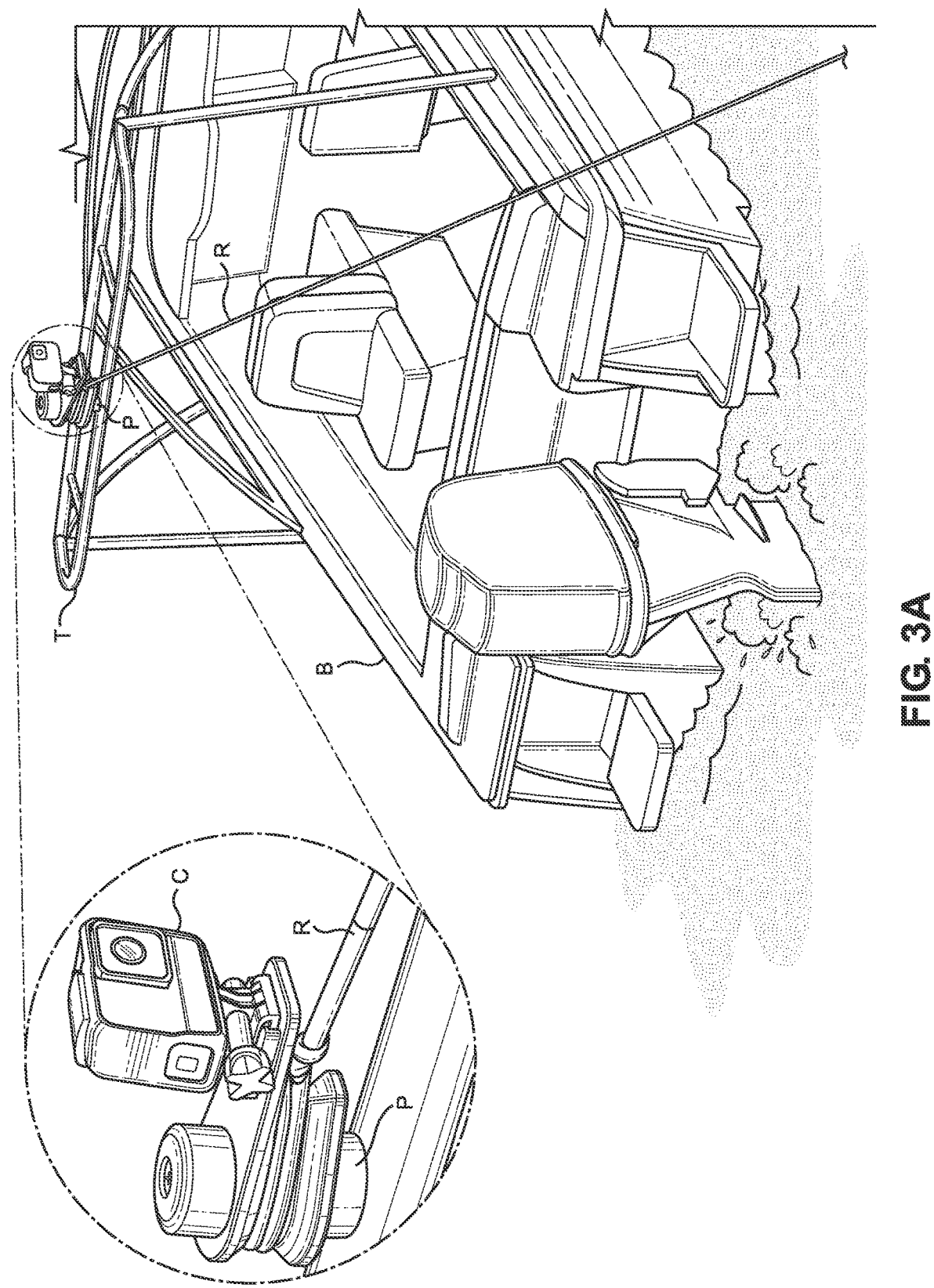
FIGS. 3A and 3B depict how the ski tow pivots or rotates in a manner such that a camera mounted on the ski tow remains aligned with the ski rope.
Figure 3B:
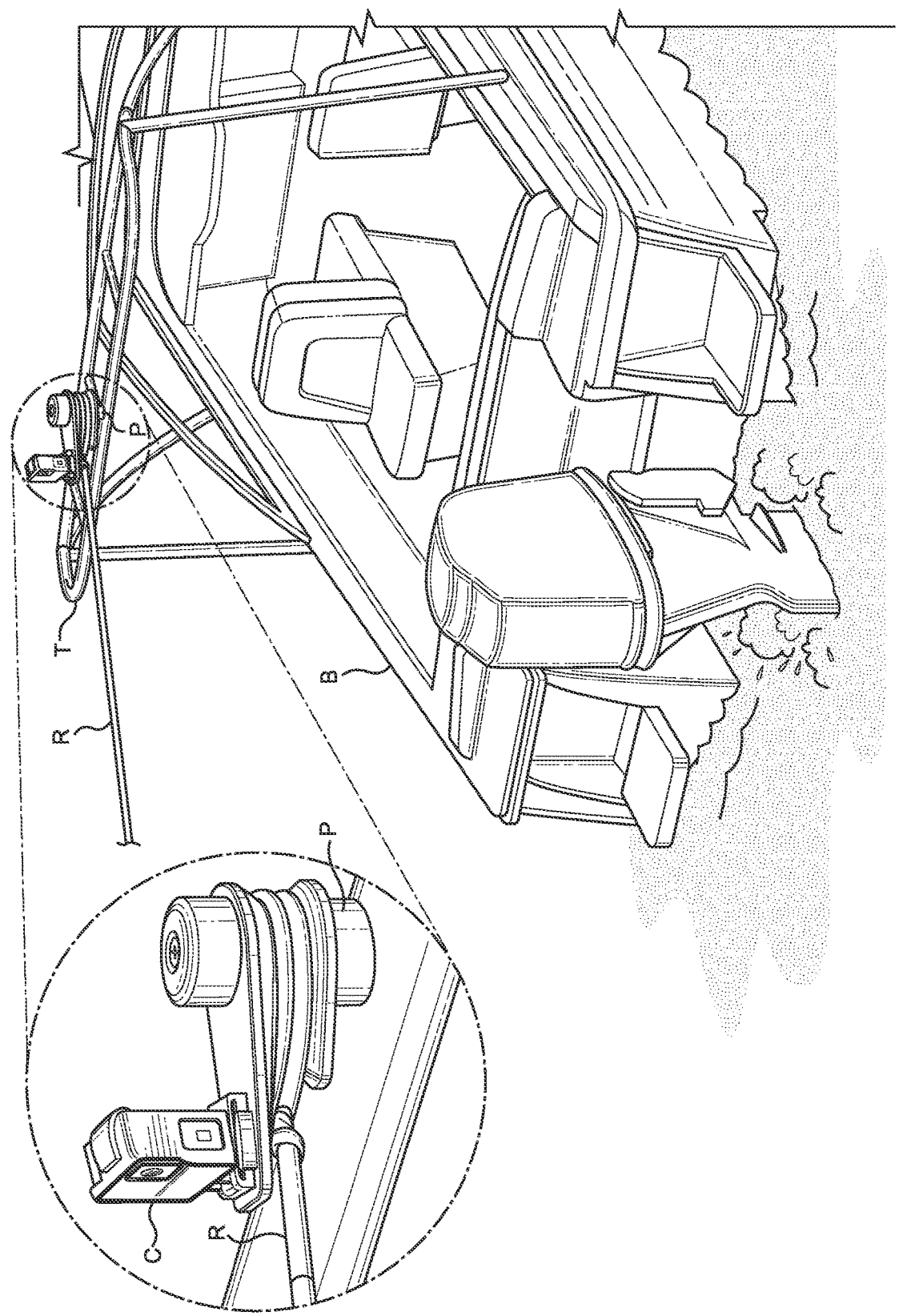

The camera mount 12 is configured for mounting of the conventional foot or like structure of the camera C. If necessary, an adapter may be provided with the camera mount 12 for adapting to a variety of cameras. As shown, the camera mount 12 is located at a front end of the cap 16, and is provided as by a pair of spaced apart L-shaped rails 12a and 12b extending upwardly from the cap 16. The rails 12a and 12b are oriented so that the legs thereof extend upwardly from the cap 16 and the shorter feet of the L-shape are raised above the cap 16 and aligned to face one another and lie parallel to the upper surface of the cap 16. FIGS. 3A-3B show and example of the mounting of the camera C to the camera mount 12.

The foot 14 is generally elongate and ovalized, with the oval generally smaller at a front or proximal end 14a. The foot 14 is sloped or chamfered toward the die 18 to reduce sharp edges therebetween that might cut or abrade the ski rope R.

The cap 16 is generally elongate and ovalized, with the oval generally smaller at a front or proximal end 16a. The cap 16 is sloped or chamfered toward the die 18 to reduce sharp edges therebetween that might cut or abrade the ski rope R. The cap 16 includes an upper surface 16b that extends proximally forward and extends beyond the foot 14 to provide an elevated surface for locating the camera C. As noted above, the camera mount 12 is desirably defined on or located adjacent the proximal or front end of the upper surface 16b.

Figure 4:
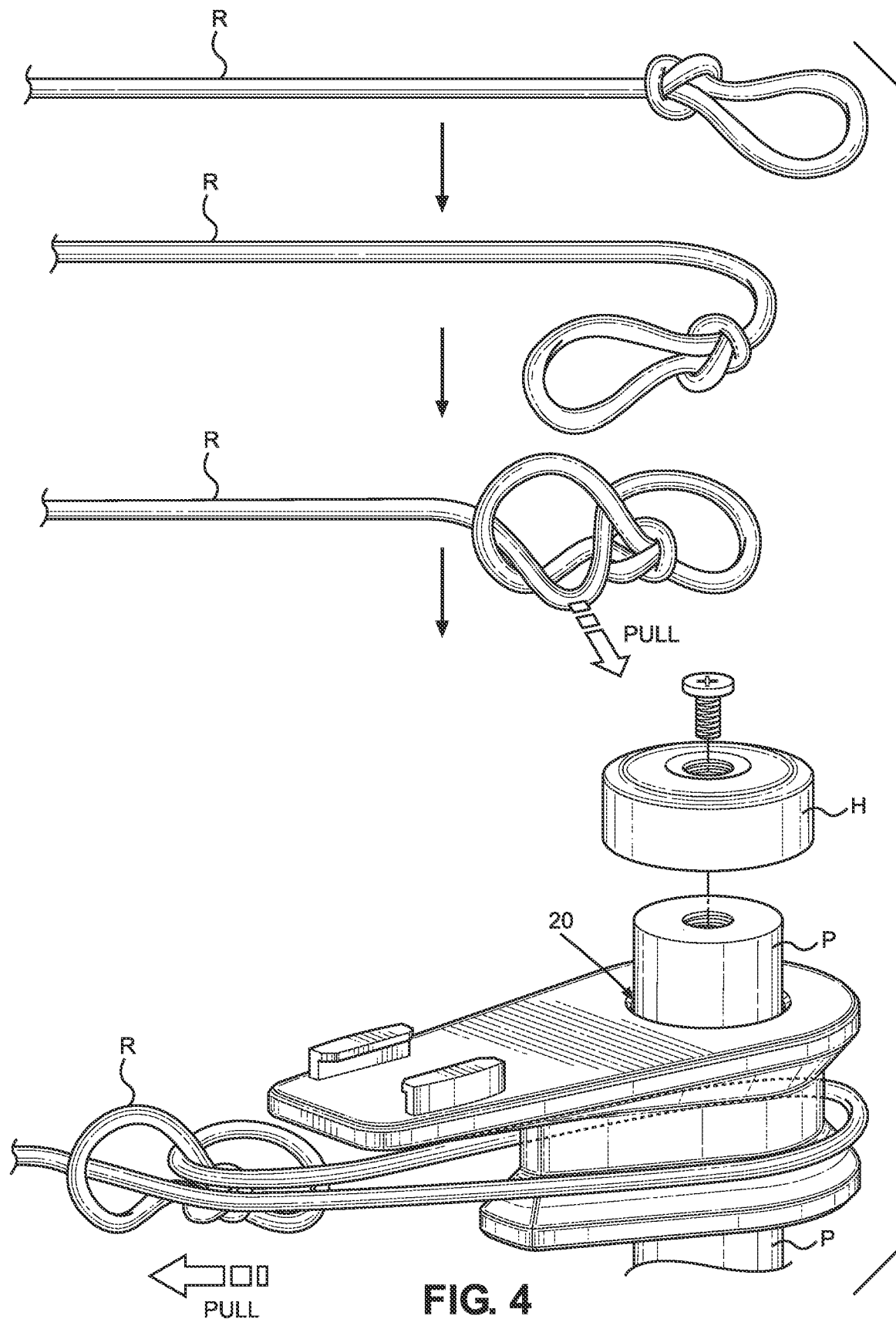
FIGS. 4 and 5 depict installation of a ski tow line onto the ski tow.
Figure 5:
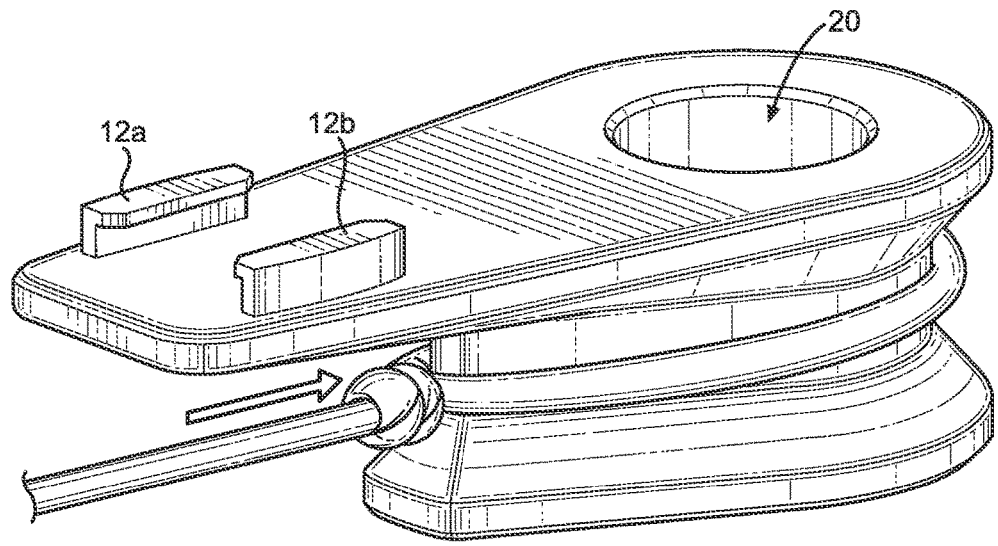
Figure 6:
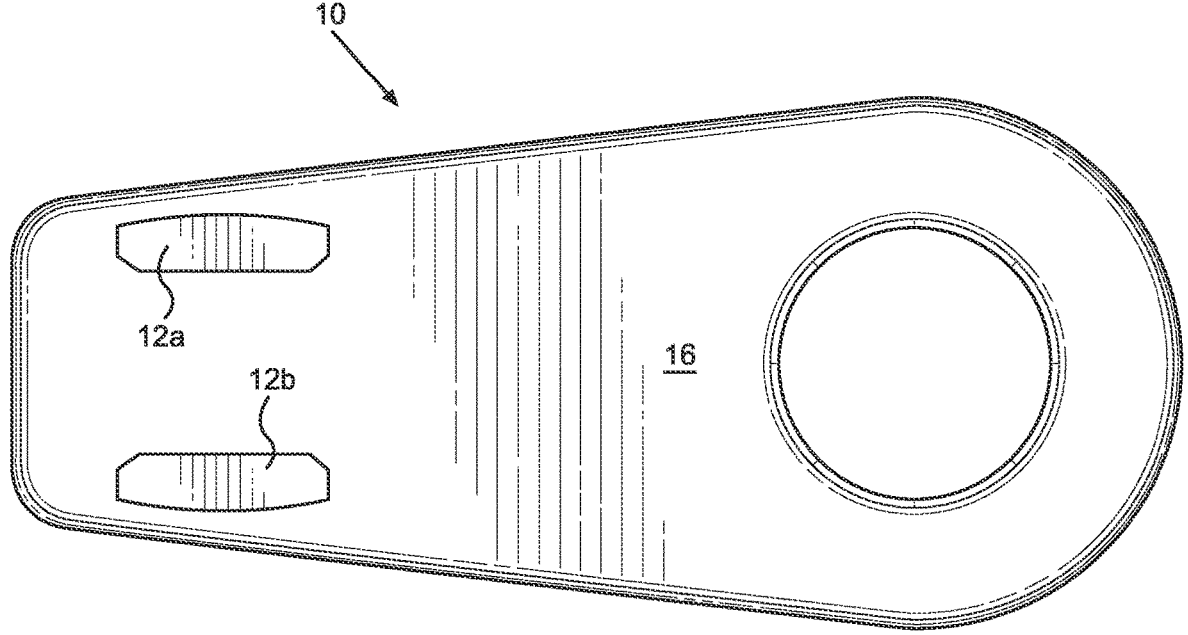
FIG. 6 is a top view of the ski tow.
Figure 7:
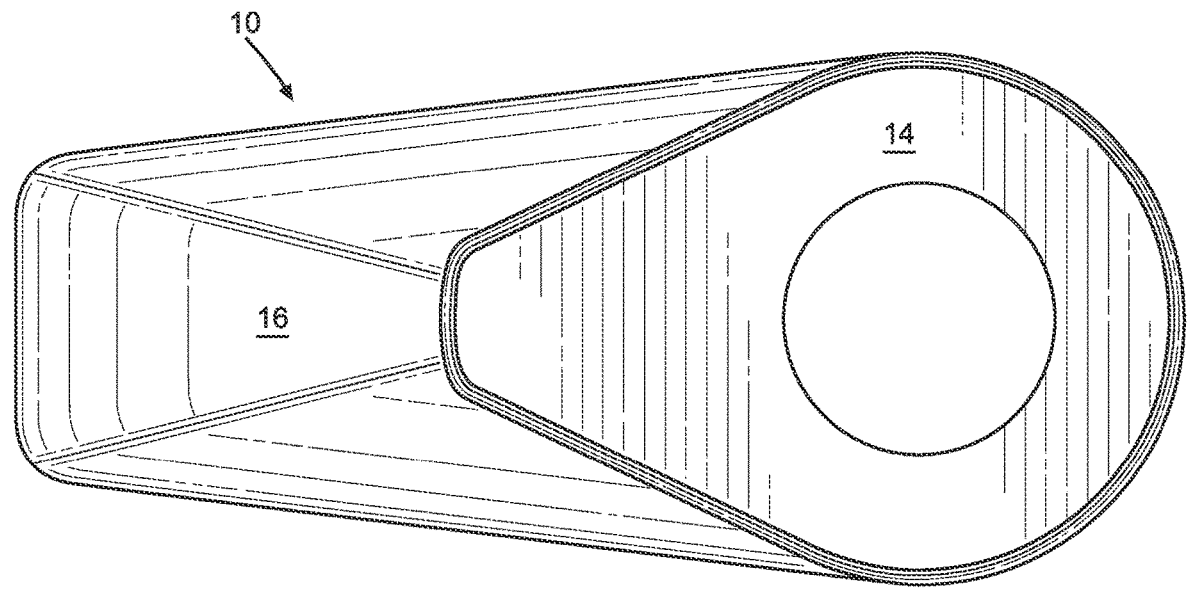
FIG. 7 is a bottom view of the ski tow.
Figure 8:
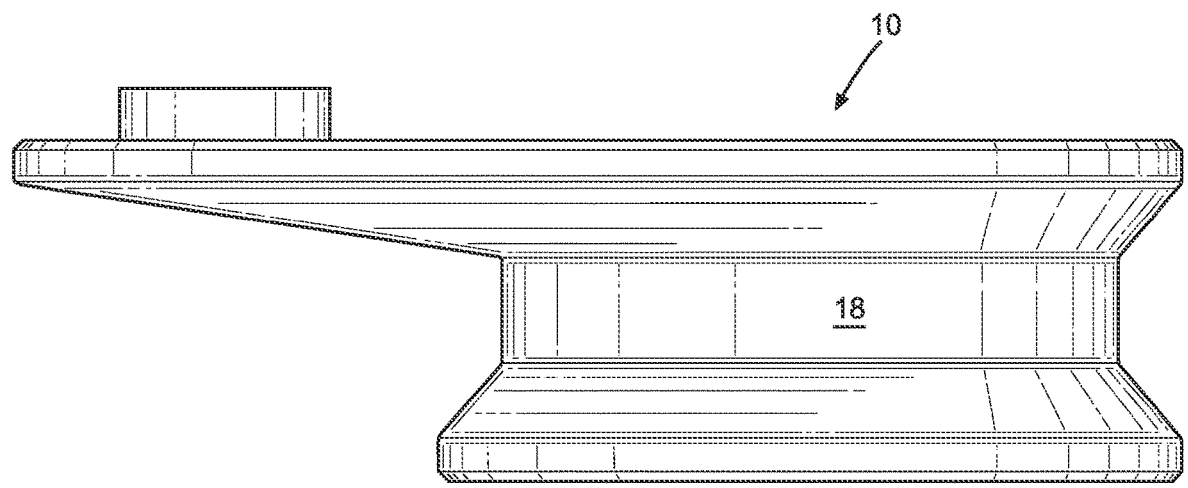
FIG. 8 is a left-side view of the ski tow.
Figure 9:
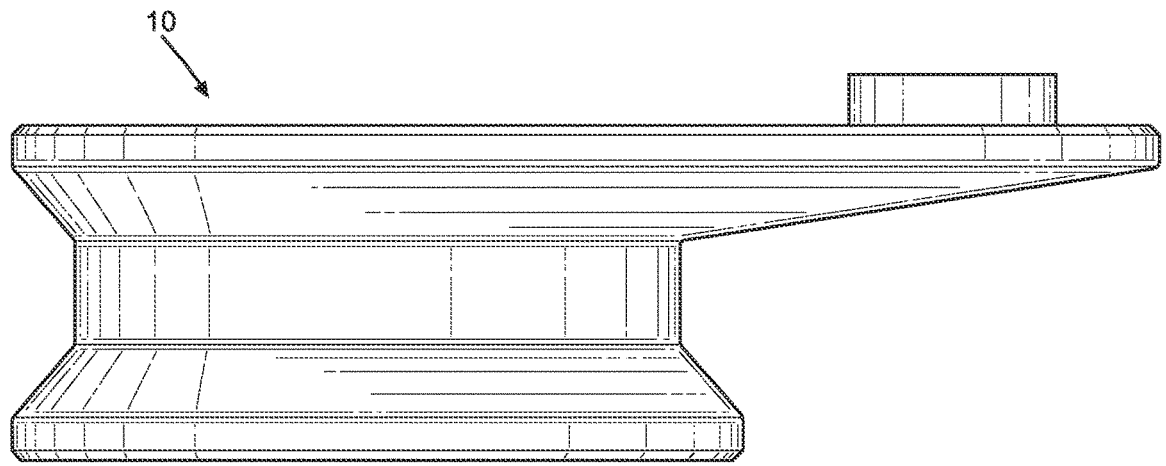
FIG. 9 is a right-side view of the ski tow.
Figure 10:
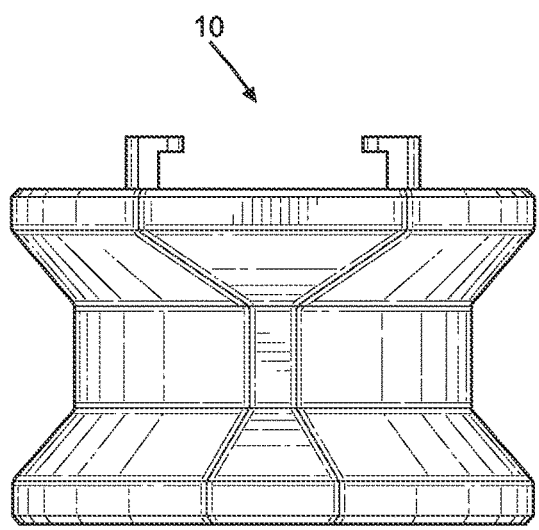
FIG. 10 is a front view of the ski tow.
Figure 11:
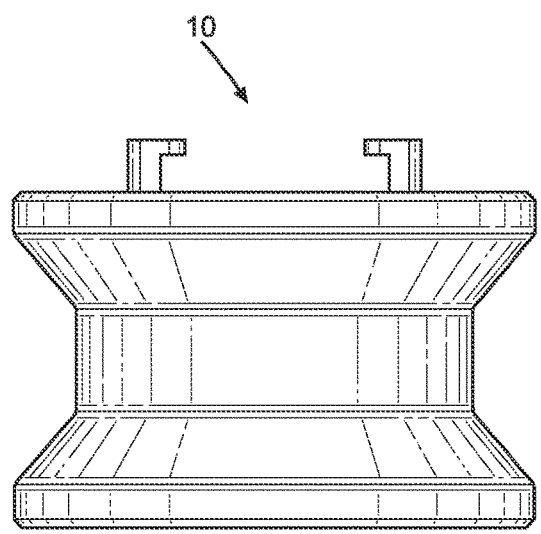
FIG. 11 is a rear view of the ski tow.

The die 18 is generally elongate and ovalized, with the oval generally smaller at a front or proximal end 18a. The die 18 is configured to have a smooth surface for receiving the ski rope R as shown in FIGS. 4-5. As shown, the ski rope R may easily be slipped onto the die 18, with the die 18 being configured to guide the ski rope R toward the skier or wakeboarder or the like using the ski rope R.

The chase 20 is sized and configured for receiving the tow post P. As seen in FIG. 4, the tow post P has a removable head H. Thus, the ski tow 10 may be installed on the tow post P by removing the head H and locating the chase 20 of the ski tow 10 over the tow post P and dropping the ski tow 10 onto the post P. The head H may then be reinstalled to maintain the ski tow 10 on the tow post P because the head H is larger than the chase 20.

Figure 12:
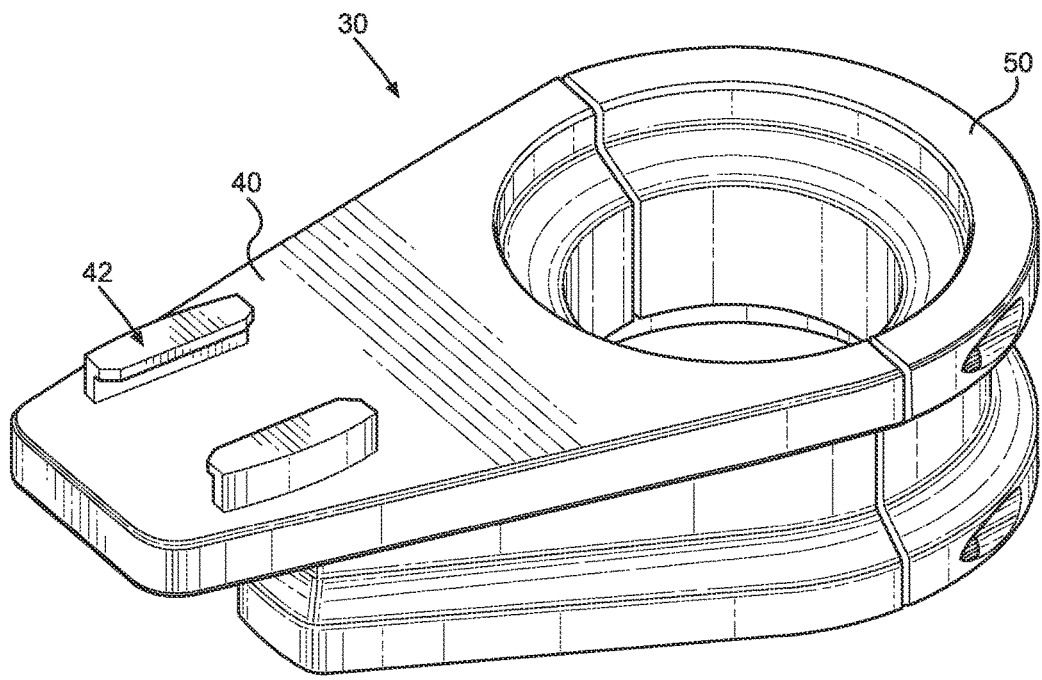
FIG. 12 is a perspective view of a two-piece ski tow according to another embodiment of the disclosure.
Figure 13:
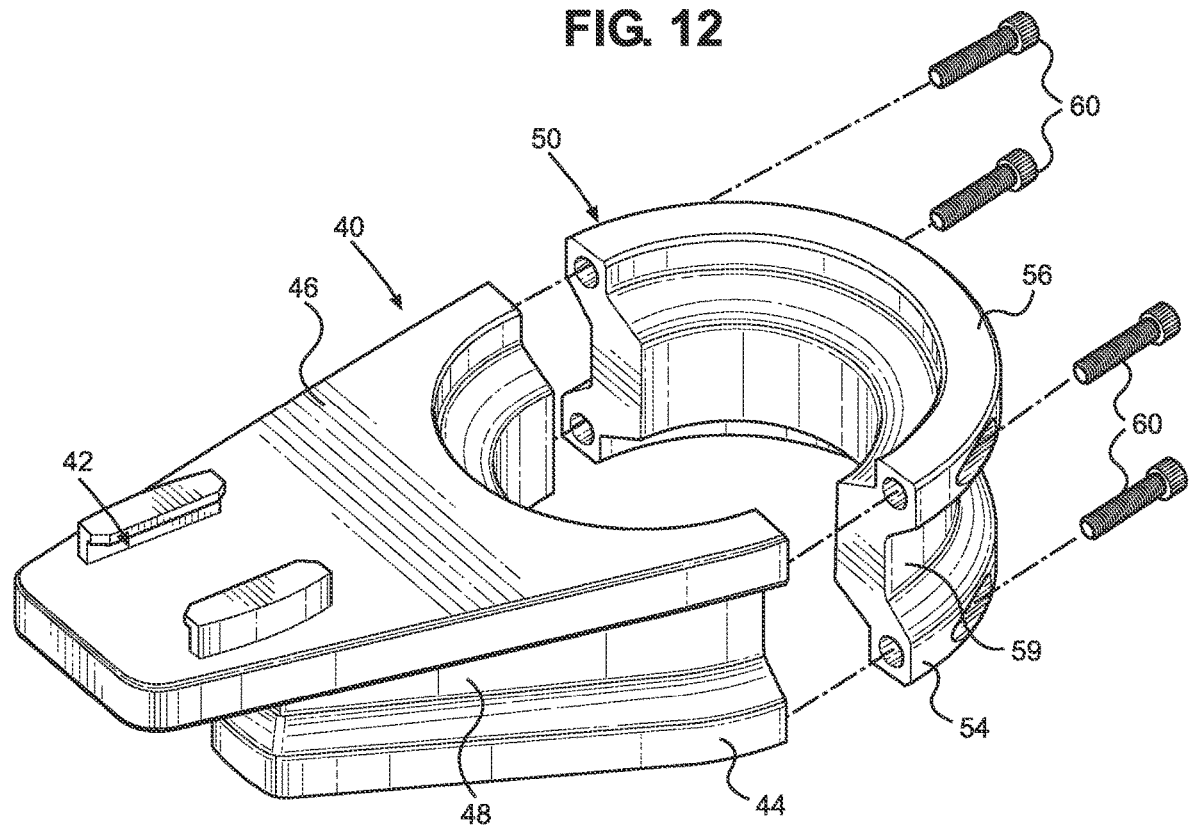
FIG. 13 is an exploded perspective view of the two-piece ski tow.
Figure 14:
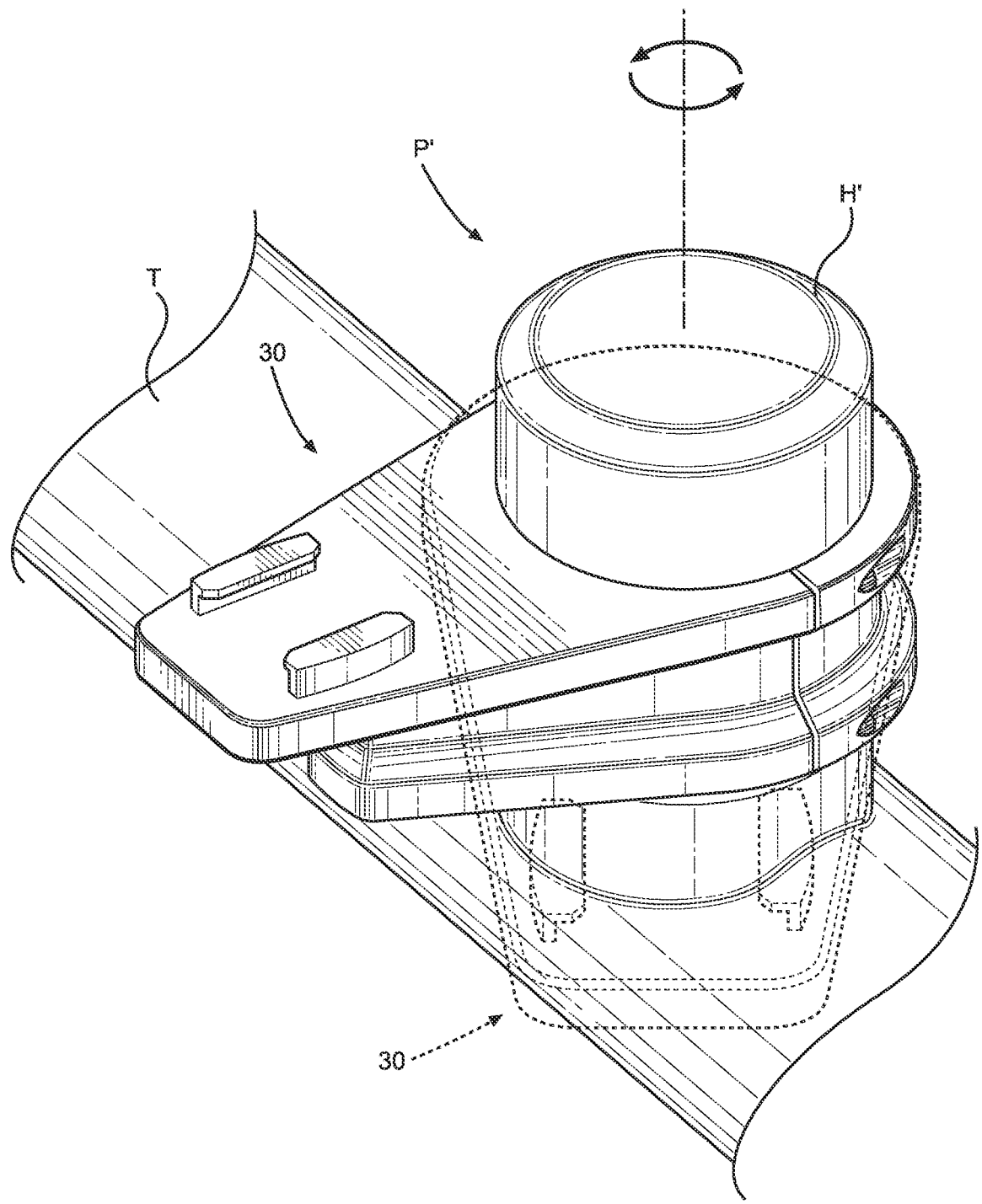
FIG. 14 shows the tow-piece ski tow mounted to a tow post of a boat.

With reference now to FIGS. 12-14, there is another embodiment of a ski tow 30 pivotally or rotatably mountable on a tow post. The ski tow 30 is substantially similar to the ski tow 10, except it is configured to be of two-piece construction. The ski tow 30 is particularly desirable in the event the tow post is configured as the tow post P' shown in FIG. 14, having a head H' that is not removable.

The ski tow 30 has a front portion 40 and a rear portion 50. The front portion 40 and the rear portion 50 are assembled together about the tow post P' by use of fasteners 60. The fasteners 60 pass through apertures of the rear portion 50 which are aligned with threaded apertures of the front portion, and into which the fasteners are threaded to secure the front portion 40 and the rear portion 50 together about the tow post P'.

The front portion 40 includes a camera mount 42, a front foot portion 44, a front cap portion 46, and a front die portion 48. The camera mount 42 is identical to the camera mount 12. The rear portion 50 includes a rear foot portion 54, a rear cap portion 56, and a rear die portion 58.

When the front portion 40 and the rear portion 50 are joined together, the front foot portion 44 and the rear foot portion 54 provide a resulting structure corresponding to the foot portion 14. Likewise, the front cap portion 46 and the rear cap portion 56 provide a cap structure corresponding to the cap 16, and the front die portion 48 and the rear die portion 58 provide a die corresponding to the die 18.

Accordingly, as shown, the disclosure provides ski tows that are advantageously configured to be easily installed and to easily have a ski rope installed thereon. In addition, the ski tows include a camera mount and the tows are configured so that the camera is located for an unobstructed view of a skier or the like that remains aligned with a ski rope as the skier pivots or moves relative to the tow post as the skier moves the tow rope.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A ski tow for a boat having a tow post and a ski rope connected to the tow post and extending away from the tow post, comprising:
   a pedestal shaped body mountable on the tow post and having a lowermost foot vertically spaced apart from and below an uppermost cap by an intermediate surface located between the lowermost foot and the uppermost cap and configured for receiving the ski rope, wherein the uppermost cap includes an upper surface that extends proximally forward and beyond a front of the lowermost foot to provide an elevated surface;
   a camera mount configured for receiving a camera and located adjacent a front end of the upper surface on the uppermost cap to be directly above and overlie the ski rope extending away from the tow post; and
   a chase extending vertically through the pedestal body and open on both ends,
   wherein the pedestal shaped body pivots or rotates from contact of the ski rope with the intermediate surface such that the camera mount remains directly above and aligned with the ski rope as a skier connected to the tow rope moves relative to the tow post and moves the tow rope relative to the tow post.

2. The ski tow of claim 1, wherein the ski tow is of one-piece construction.

3. The ski tow of claim 1, wherein the ski tow is of two-piece construction.

4. The ski tow of claim 1, wherein the foot, cap, and intermediate surface are each generally elongate and ovalized.

5. The ski tow of claim 4, wherein the foot and the cap are each sloped or chamfered toward the intermediate surface.

* * * * *